(12) United States Patent
Luce

(10) Patent No.: US 6,789,417 B2
(45) Date of Patent: Sep. 14, 2004

(54) METHOD FOR SENSING EVAPORATION OF A LIQUID

(75) Inventor: Charles H. Luce, Boise, ID (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 10/259,019

(22) Filed: Sep. 27, 2002

(65) Prior Publication Data

US 2003/0046995 A1 Mar. 13, 2003

Related U.S. Application Data

(62) Division of application No. 09/637,031, filed on Aug. 10, 2001, now Pat. No. 6,490,917.

(51) Int. Cl.$^7$ .................................................. G01W 1/00
(52) U.S. Cl. ................................. 73/170.16; 73/170.22
(58) Field of Search ........................ 73/170.16, 170.17, 73/170.18, 170.21, 170.22, 290 R, 305, 309, 322.5

(56) References Cited

U.S. PATENT DOCUMENTS

| | | | | |
|---|---|---|---|---|
| 4,380,248 A | * | 4/1983 | Ambrus et al. | ............. 137/428 |
| 4,386,525 A | * | 6/1983 | Mooney | ..................... 73/49.2 |
| 4,646,560 A | * | 3/1987 | Maresca et al. | ............. 73/49.2 |
| 4,839,590 A | * | 6/1989 | Koski et al. | ........... 324/207.21 |
| 4,852,054 A | * | 7/1989 | Mastandrea | ................... 702/51 |
| 5,156,042 A | * | 10/1992 | Carlin et al. | ................. 73/49.2 |
| 5,284,052 A | * | 2/1994 | Thompson | ............... 73/170.21 |

* cited by examiner

*Primary Examiner*—Eric S. McCall
(74) *Attorney, Agent, or Firm*—John D. Fado; Lesley Shaw; Janet I. Stockhausen

(57) ABSTRACT

A magnetostrictive precipitation gage includes a catch tube having an upper opening configured to receive precipitation therein. A vertical magnetostrictive rod and corresponding magnetic float linearly displaceable thereon are used to determine the fluid level within the catch tube. More particularly, as the fluid level fluctuates in the catch tube, so will the vertical position of the float, which interacts magnetically with the magnetostrictive rod. Accordingly, the vertical position of the float may be detected to determine the fluid level within the catch tube, and calculations regarding precipitation may be performed.

4 Claims, 3 Drawing Sheets

US 6,789,417 B2

METHOD FOR SENSING EVAPORATION OF A LIQUID

This application is a divisional of U.S. application Ser. No. 09/637,031 filed Aug. 10, 2000, now U.S. Pat. No. 6,490,917, issued Dec. 10, 2002.

STATEMENT OF GOVERNMENT INTEREST

The invention described herein may be manufactured, used and licensed by or for the U.S. Government as represented by the Secretary for the United States Department of Agriculture.

BACKGROUND OF THE INVENTION

1. Field of the Invention

The present invention relates to precipitation gages and, more particularly, relates to a precipitation gage using a magnetostrictive transducer to measure precipitation levels.

2. Discussion of the Related Art

Precipitation gages are well known to include a generally cylindrical cavity having an upwardly facing opening configured to collect precipitation, such as rain or snow. Conventional precipitation gages typically include mechanical mechanisms that output signals indicative of the amount of precipitation within the cylinder. For instance, a precipitation gage may include a spring or other type of compressive element that is positioned at the bottom of the cylinder and compresses as precipitation accumulates within the cylinder. The amount of compression is thereby converted to the amount of precipitation based on the known spring constant.

Another precipitation gage currently used includes a pressure transducer that outputs signals corresponding to the amount of pressure sensed within the cylinder, which will change according to the amount of precipitation within the cylinder.

The amount of spring compression or, alternatively, the signals output by the pressure transducer are fed into a data manipulation system, which translates the signals into measured precipitation levels. Unfortunately, these precipitation gages are subject to fluctuations due to the wide variations in ambient temperature that occur throughout a given year, which affect the sensitivity of the spring constant, and additionally affect the ambient pressure which could thereby limit the effectiveness of a pressure transducer. Spring gages are additionally costly to manufacture.

What is therefore needed is a precipitation gage that is robust to temperature fluctuations, and that is relatively inexpensive to manufacture.

BRIEF SUMMARY OF THE INVENTION

In accordance with a first aspect of the invention, a magnetostrictive precipitation gage includes an elongated catch tube having an upwardly facing opening and a base and is configured to receive precipitation therein. A magnetostrictive transducer includes a rod extending upwardly from the base and a corresponding buoyant magnetized float that is linearly displaceable along the rod. Therefore, as precipitation accumulates within the catch tube, the rod senses the placement of the float and the magnetostrictive transducer outputs voltage signals to a data logger, which is configured to process the voltage signals and output data reflecting the precipitation levels over a given period of time.

These as well as other features and characteristics of the present invention will be apparent from the description which follows. In the detailed description below, preferred embodiment of the invention will be described with reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE INVENTION

Figure 1:
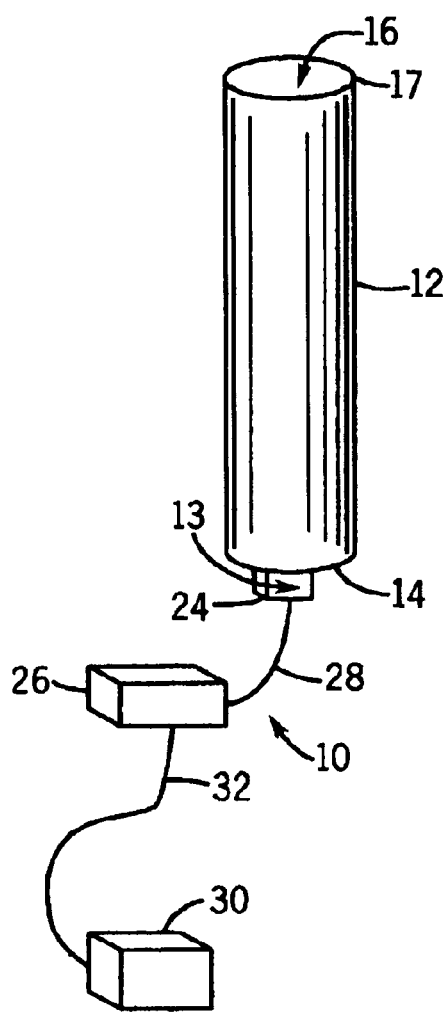
FIG. 1 is a perspective view of a precipitation gage in accordance with one embodiment of the present invention.
Figure 2:
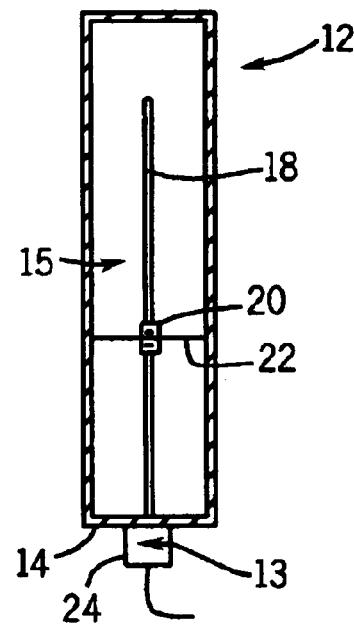
FIG. 2 is a sectional side elevation view of the precipitation gage of FIG. 1.
Figure 3:
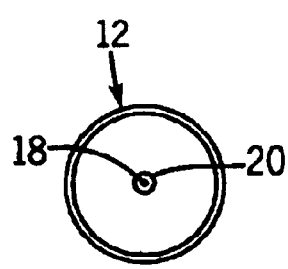
FIG. 3 is a top plan view of the precipitation gage of FIG. 1.

Referring initially to FIGS. 1–3, a precipitation gage 10 includes an elongated cylindrical catch tube 12 having a bottom wall 14 and defining an inner cavity 15 having an upper opening 16. The upper walls 17 of the catch tube 12 are beveled so as to prevent the accumulation of snow on the catch tube, which could result in the accumulation of inaccurate precipitation levels within the catch tube 12. The diameter of the catch tube is preferably between 6 and 12 inches, and is uniform throughout the tube so as to provide accurate measurements of precipitation. The upper walls 17 of the catch tube 12 are beveled so as to prevent the accumulation of snow on the catch tube, which could result in the accumulation of inaccurate precipitation levels within the catch tube 12. The catch tube 12 may be made of a plastic, metal, fiberglass, or any other material suitable for collecting precipitation. A larger diameter of catch tube 12 is preferable so as to provide a greater sampling area for the precipitation gage 10. In operation, it is desirable to partially fill the catch tube 12 with antifreeze initially so that as precipitation falls, it melts, thereby increasing the accuracy of the precipitation gage 10. The antifreeze also prevents fluid already in the gage from freezing. As precipitation accumulates, the antifreeze will become dilute, so the initial charge of antifreeze should be sufficiently deep so as to provide adequate protection as the catch tube 12 fills. A surface coating of oil on the top of the fluid in the catch tube 12 prevents evaporation of the fluid.

The precipitation gage 10 includes a magnetostrictive transducer 13 having a generally cylindrical rod 18 extending upwardly from the bottom wall 14. The upper walls 17 of the catch tube 12 are beveled so as to prevent the accumulation of snow on the catch tube, which could result in the accumulation of inaccurate precipitation levels within the catch tube 12. Preferably, the rod 18 has a length of one foot to provide high precision in measurement, or can be up to two or three feet long for gages where considerable precipitation is expected with infrequent maintenance. It should be appreciated that a shorter rod 18, while providing for greater accuracy, would necessitate emptying of the precipitation gage 10 at more frequent intervals. It has been determined that the precision of a gage 10 having a one-foot rod is approximately 0.005 inches using a commonly available data logger 26.

A float 20 is mounted on the rod 18 for sliding displacement therealong, and contains a generally circular magnet therein. As a result, as the fluid level 22 lowers and rises within the catch tube 12, the float 20 will be displaced up and down accordingly. The rod 18 includes a magnetostrictive wire extending from the tip of the rod 18 through the bottom wall 14 and into a magnetostrictive transducer head 24. The head 24 may be protected by the ambient environment by providing a housing that is attached to the outside of bottom wall 14 so as to encapsulate the head. For the sake of convenience and clarity, the combination of the housing and magnetostrictive transducer head will hereinafter referred to as the head 24. The head 24 encloses electronics for use in combination with magnetostrictive wires enclosed within the rod 18 to produce a voltage output indicating the location of the float 20 with reference to the rod 18. The magnetostrictive transducer is powered by a power supply 30 via electrical wire 32. It has been determined that a relatively accurate and linear response may be obtained using a 12-volt power supply. One such magnetostrictive transducer is described in more detail in U.S. Pat. No. 4,839,590, the disclosure of which is hereby incorporated by reference. It should be appreciated, however, that alternative magnetostrictive transducer designs exist, and the present invention is not intended to be limited to the configuration described above.

With continuing reference to FIG. 1, a data logger is connected to the magnetostrictive transducer head 24 via an electrical wire 28 that inputs varying voltage signals corresponding to the fluid level 22, as indicated by the interaction between rod 18 and float 20, from the head 24. The data logger includes electronic circuitry to compute and output statistical information regarding precipitation levels that are experienced over a given period of time. While the catch tube 12 is illustrated as being generally cylindrical in accordance with the preferred embodiment, it should be appreciated that the tube may be of any other suitable configuration, for example, rectangular. Accordingly, the catch tube 12 is not intended to be limited to cylindrical structures.

Figure 5:
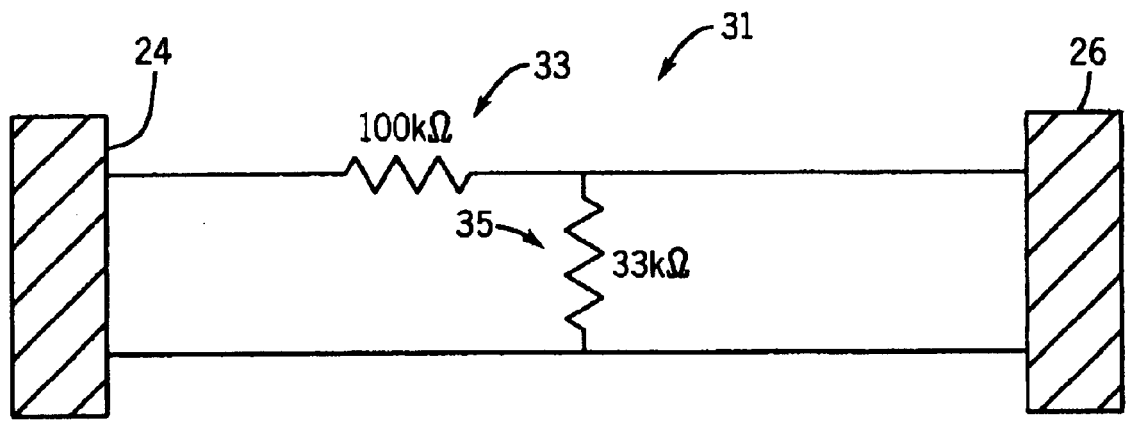
FIG. 5 illustrates a schematic circuit usable in combination with the data collection circuitry in accordance with the precipitation gage of FIG. 1.

Conventional magnetostrictive transducers may output voltages ranging from zero to 10 volts, while conventional data loggers are capable of reading up to 2.5 volts, and sometimes up to 5 volts. Accordingly, referring now to FIG. 5, the electrical connection 28 includes a voltage splitter 30, which reduces the relatively high voltage output from housing 24 to acceptable values that are processed by the data logger 26. Specifically, the voltage splitter 30 includes a resistor 32 that is connected in series with a resistor 34 and data logger 26. One having skill in the art will recognize that the voltage drop in this configuration will equal the resistance of resistor 34 divided by the sum of resistances of resistors 32 and 34. Accordingly in the illustrated embodiment, a ten voltage output from the head 24 will input to the data-logger 26 as 10*(33/133)=2.5 volts. It should further be appreciated that if resistor 32 was modified to include a resistance of 33 kilo-ohms, the resulting input to the data logger would equal 5 volts.

It should be recognized that the voltage splitter 31 described above may not be necessary in configurations wherein the magnetostrictive transducer outputs voltage values that are acceptable to the data logger and that alternative voltage splitter configurations may be necessary so as to accommodate various data loggers.

Figure 4:
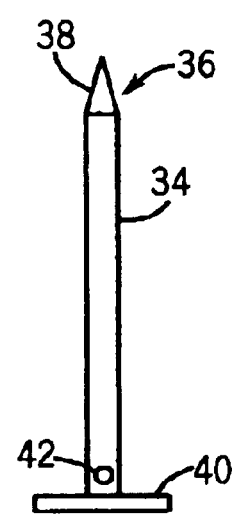
FIG. 4 is a rod cover that may optionally be used in combination with the precipitation gage of FIG. 1.

Referring to FIG. 4, a rod cover 36 includes a generally cylindrical pipe 34 having a conical top 38 and is hollow so as to fit over the magnetostrictive rod 18. The diameter of the cover 36 is sufficiently large so as to fit over the float 20. The cover 36 is particularly useful during deep snowfall events, where a danger exists that the float 20 could become covered by snow, thereby preventing an accurate response, which could render the precipitation gage 10 inoperative for a substantial period of time. The cover 36 further includes a base plate 40 to provide support to the cover when it is mounted within the catch tube 12. One or more holes 42 extending through the pipe 34 near the bottom so as to permit precipitation entering the catch tube 12 to travel within the pipe, thereby activating the floater 20.

Figure 6:
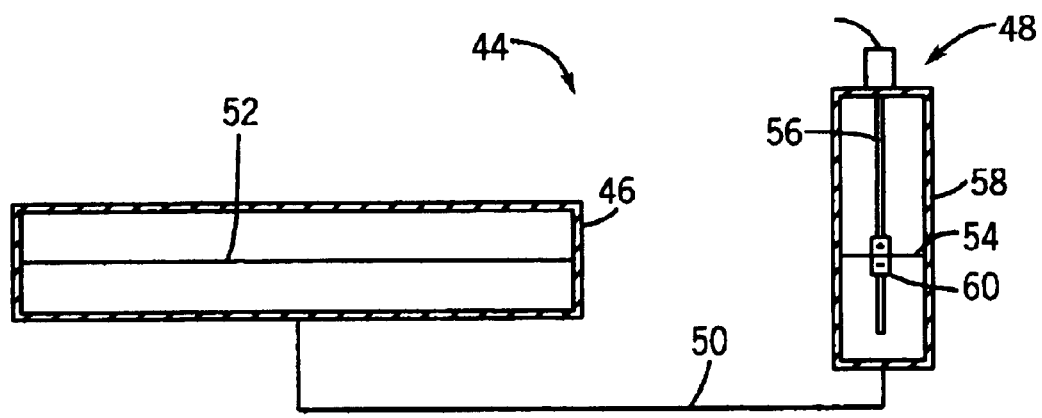
FIG. 6 is a schematic view of an evaporation pan gage employing a magnetostrictive transducer in accordance with the preferred embodiment.

Referring now to FIG. 6, an evaporation sensor 44 includes an evaporation pan 46 that is in fluid communication with a fluid reservoir 48. Specifically, an elongated pipe 50 extends from the base of the evaporation pan 46 to the base of the fluid reservoir 48 and allows fluid within the fluid reservoir 48 to travel into the evaporation pan 46. In operation, therefore, a known relationship exists between a decrease in fluid level 52 within evaporation pan 46, and the corresponding decrease of the fluid level 54 within fluid reservoir 48. The relationship depends largely on the diameter of the evaporation pan 46 with respect to that of the fluid reservoir 48, as is understood to one having ordinary skill in the art. The fluid reservoir 48 operates in a similar manner with the precipitation gage as described in FIG. 1. However, the rod 56 is suspended from the top of the catch tube 58 and has a float 60 that will lower as the fluid level 54 lowers, thereby providing a relationship between the evaporation rate and the fluid level 52. Accordingly, the data logger 26 will provide data relating to the evaporation rate over a given period of time.

Figure 7:
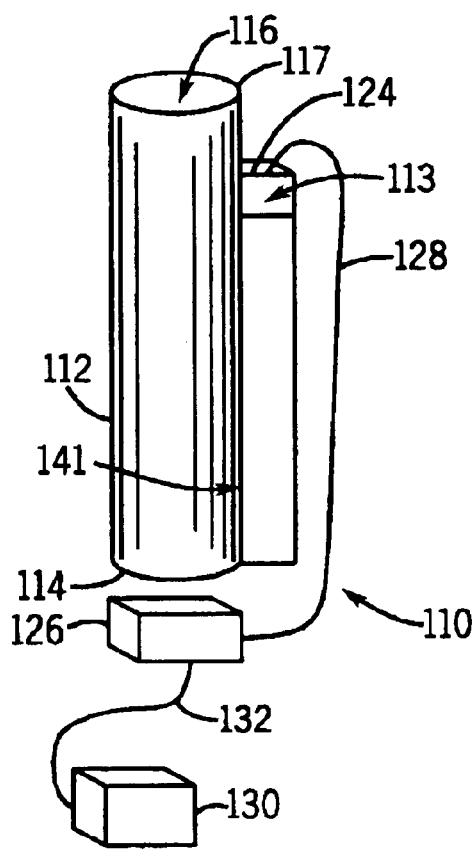
FIG. 7 is a perspective view of a precipitation gage in accordance with another embodiment of the present invention.
Figure 8:
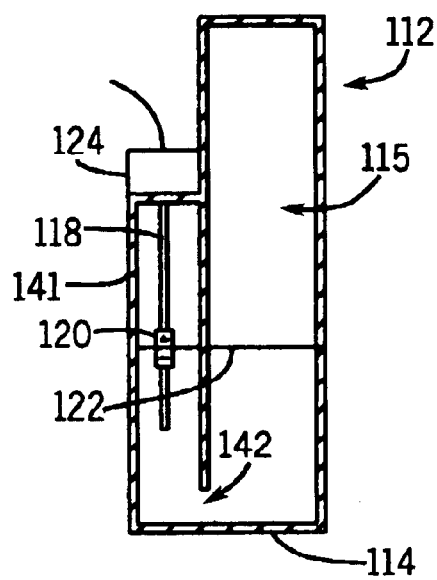
FIG. 8 is a sectional side elevation view of the precipitation gage of FIG. 7.
Figure 9:
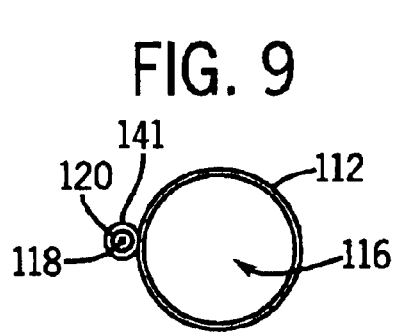
FIG. 9 is a top plan view of the precipitation gage of FIG. 7.

Referring now to FIGS. 7–9, a precipitation gage 110 in accordance with another embodiment is illustrated having reference numerals corresponding to similar parts of the precipitation gage 10 of FIGS. 1–3 incremented by one hundred. In particular, the precipitation gage 110 includes an elongated cylindrical magnetostrictive tube 140 disposed adjacent and connected to the catch tube 112 by one of any known suitable methods. A magnetostrictive transducer head 124 is disposed on top of the tube 140, and is connected to a magnetostrictive rod 118 that extends downwardly therefrom and includes a float 120, which operates as described above. An aperture 142 exists at the bottom between the tubes 112 and 140 to permit fluid entering the catch tube to flow into the magnetostrictive tube 140 to facilitate measurement of the fluid level 122. The magnetostrictive tube 140 may be clear with having a fluid level sight gage to allow a user to obtain visual readings of the fluid level 122.

The embodiment illustrated in FIGS. 7–9 allows increased ease of maintenance by allowing access to the precipitation gage 110 from above the fluid level 122, thereby eliminating the need to drain the gage prior to maintenance. A stop may exist on the bottom of the rod to allow retrieval of the float 120 when the rod 118 is removed during, for example, rod replacement. It is furthermore recognized that the accuracy of the precipitation measurements is increased as the opening 116 of the precipitation gage 110 approaches ground level. Accordingly it is desirable to bury a significant portion of the precipitation gage 110. Because the magnetostrictive head 124 is positioned on top of the tube 140, the gage 110 may be buried while allowing access to the electronics for maintenance purposes. It should be appreciated, in this embodiment, that the diameter of the magnetostrictive tube 140 is preferably minimized to increase accuracy the correlation between the fluid level 122 detected in the magnetostrictive tube 141 and that in the catch tube.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

What is claimed is:

1. A method for sensing evaporation of a fluid within an evaporation pan that is in fluid communication with a fluid gage including an elongated container enclosing a magnetostrictive transducer having a magnetostrictive rod extending vertically in the container and a buoyant magnetized float that is movable linearly from a first position along the rod as a fluid level in the container decreases, the method comprising the steps of:

a) evaporating a quantity of fluid from the evaporation pan;

b) decreasing the fluid level in the container an amount proportional to the evaporated fluid, wherein the container is located remotely from the evaporation pan;

c) vertically displacing-said float along the rod to a second position in response to the decrease in fluid level;

d) after step C, determining the second position of the float with respect to the rod based on a magnetic interaction between the float and the rod; and e) determining an amount of fluid evaporated from said evaporation pan based directly on the second position of the float.

2. The method as recited in claim 1, wherein step (e) further comprises determining a relationship between the difference of the first and second position, and the amount of fluid reduced in the container.

3. The method as recited in claim 2, further comprising determining a relationship between the amount of fluid reduced in the container, and the amount of fluid evaporated in the evaporation pan.

4. The method as recited in claim 1, wherein the evaporation pan and container are in fluid communication via a conduit, and wherein step (a) further comprises transferring fluid from the container to the evaporation pan.

* * * * *